(12) United States Patent
Barcomb et al.

(10) Patent No.: US 7,954,866 B2
(45) Date of Patent: Jun. 7, 2011

(54) BUMPER BEAM WITH GUSSETS TO PREVENT UNDERRIDE

(75) Inventors: Kevin Barcomb, Dublin, OH (US); Warren Alan Day, Dublin, OH (US); Nick A. Massaro, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/167,627

(22) Filed: Jul. 3, 2008

(65) Prior Publication Data
US 2010/0001540 A1 Jan. 7, 2010

(51) Int. Cl.
*B60R 19/02* (2006.01)

(52) U.S. Cl. ........................................ 293/143; 293/102

(58) Field of Classification Search .................. 293/132, 293/133, 143, 115, 144, 102; 296/187.09, 296/187.11
See application file for complete search history.

(56) References Cited

U.S. PATENT DOCUMENTS

| | | | | |
|---|---|---|---|---|
| 1,740,528 A * | 12/1929 | Veale | | 293/146 |
| 2,023,078 A * | 12/1935 | Jandus et al. | | 293/152 |
| 2,731,289 A * | 1/1956 | Corydon, II | | 293/108 |
| 3,677,594 A | 7/1972 | Gussack et al. | | |
| 3,842,565 A * | 10/1974 | Brown et al. | | 52/717.05 |
| 3,895,835 A | 7/1975 | Thomson | | |
| 3,920,117 A * | 11/1975 | Roinestad | | 198/853 |
| 4,168,855 A * | 9/1979 | Koch | | 293/115 |
| 4,397,490 A | 8/1983 | Evans et al. | | |
| 5,215,343 A * | 6/1993 | Fortune | | 293/121 |
| 5,326,133 A | 7/1994 | Breed et al. | | |
| 5,560,662 A * | 10/1996 | Apgar et al. | | 293/121 |
| 6,056,337 A * | 5/2000 | Oguri et al. | | 293/142 |
| 6,231,093 B1 * | 5/2001 | Storer | | 293/115 |
| 6,318,773 B2 * | 11/2001 | Storer | | 293/115 |
| 6,398,275 B1 | 6/2002 | Hartel et al. | | |
| 6,540,277 B2 * | 4/2003 | McCoy et al. | | 293/117 |
| 6,588,827 B2 * | 7/2003 | Heiland | | 296/136.1 |
| 6,733,055 B2 * | 5/2004 | Iino | | 293/142 |
| 6,832,795 B2 | 12/2004 | Bastien et al. | | |
| 6,905,153 B2 * | 6/2005 | Murray et al. | | 293/115 |
| 7,533,912 B2 * | 5/2009 | Frederick et al. | | 293/120 |
| 2006/0220399 A1 | 10/2006 | Fortin | | |
| 2007/0262614 A1 | 11/2007 | Asai | | |

FOREIGN PATENT DOCUMENTS

JP 57-147967 9/1982

OTHER PUBLICATIONS

International Search Report and Written Opinion mailed Dec. 1, 2009 from PCT Application No. PCT/US2009/49456.
International Preliminary Report on Patentability mailed Jan. 13, 2011 in International Application No. PCT/US2009/049456.

* cited by examiner

*Primary Examiner* — Glenn Dayoan
*Assistant Examiner* — Gregory Blankenship
(74) *Attorney, Agent, or Firm* — Plumsea Law Group, LLC

(57) ABSTRACT

A bumper beam with gussets is disclosed. The gussets increase engagement with a barrier and prevent underride during a collision. The gussets can be attached to a front and top surface of the bumper beam. The gussets may be offset from the center of the bumper beam and overhang the edge of the beam.

24 Claims, 4 Drawing Sheets

BUMPER BEAM WITH GUSSETS TO PREVENT UNDERRIDE

BACKGROUND OF THE INVENTION

1. Field of the Invention

The present invention relates generally to motor vehicles and in particular to a bumper with an underride protector.

2. Description of Related Art

Motor vehicles with underride and override protectors have been disclosed. Evans (U.S. Pat. No. 4,397,490) teaches a low profile bumper. Evans teaches a bumper assembly with a C-section face bar attached to a truss-formed back plate to achieve a nearly square box beam. Evans teaches that functional height is extended beyond the beam section with a plurality of under-ride stops.

Gussack (U.S. Pat. No. 3,677,594) teaches a bumper guard mounting assembly. Gussack teaches an override guard that is adapted to be pushed onto an automotive bumper, and tightened in place through an access opening on an exposed outer surface of the guard.

Fortin (U.S. patent application publication number 2006/0220399) teaches a bumper with an override feature. Fortin teaches an override feature that includes at least one override member with at least one override face. In particular, a single override face may be connected at either or both ends of the bumper beam as well as an upper edge or a lower edge of the bumper beam.

The related art lacks provisions for lightweight override protectors that cooperate with the front edge of a bumper during a collision. There is a need in the art for a design that provides for increased cooperation between an override protector and a front edge of a bumper.

SUMMARY OF THE INVENTION

A bumper beam with gussets configured to prevent bumper beam underride is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention provides a motor vehicle, comprising: a bumper beam having a generally convex shape; the bumper beam including a front surface including a center portion; a gusset disposed on a top surface of the bumper beam and overhanging a front edge of the bumper; the gusset including an engaging portion; and where the engaging portion and the center portion are generally co-planar.

In another aspect, the gusset has an elbow shape.

In another aspect, the engaging portion and the center portion are configured to contact a barrier during a collision substantially simultaneously.

In another aspect, the bumper beam includes two gussets.

In another aspect, the two gussets are spaced apart along the bumper beam in a lateral direction.

In another aspect, the bumper beam includes three or more gussets.

In another aspect, the bumper beam includes four gussets.

In another aspect, the four gussets are spaced apart along the bumper beam in the lateral direction.

In another aspect, the invention provides a motor vehicle, comprising: a bumper beam having a generally convex shape; the bumper beam including a front surface and a top surface that is disposed in a generally perpendicular manner to the front surface; a gusset disposed on a portion of the bumper beam; the gusset including a first attached portion and a second attached portion; and where the first attached portion is attached to the front surface and wherein the second attached portion is attached to the top surface.

In another aspect, the first attached portion is attached to an upper lip of the first surface.

In another aspect, the first attached portion and the second attached portion are attached to the bumper beam using a MIG weld.

In another aspect, the first attached portion is attached to the upper lip using a T-weld.

In another aspect, the gusset includes an engaging portion.

In another aspect, the engaging portion extends over a portion of the front surface.

In another aspect, the invention provides a motor vehicle, comprising: a bumper beam having a generally convex shape; a gusset attached to a portion of the bumper beam; and where the gusset is configured to contact a barrier in a collision substantially simultaneously with a portion of the bumper beam.

In another aspect, the portion of the bumper beam is a center portion.

In another aspect, two gussets are configured to contact the barrier substantially simultaneously with the portion of the bumper beam.

In another aspect, three or more gussets are configured to contact the barrier substantially simultaneously with the portion of the bumper beam.

In another aspect, the bumper beam is associated with a rear portion of the motor vehicle.

In another aspect, the bumper beam is associated with a front portion of the motor vehicle.

In another aspect, the invention provides a bumper system for a motor vehicle, comprising: a bumper beam including a front surface and a top surface; a gusset disposed on the bumper beam; the gusset including a first attachment portion and a second attachment portion; wherein the first attachment portion is attached to the front surface and wherein the second attached portion is attached to the top surface; and wherein the gusset overhangs the front surface without covering the front surface.

In another aspect, the gusset is configured to contact a barrier substantially simultaneously with a portion of the front surface.

In another aspect, the front surface includes center portion and wherein the center portion is substantially co-planar with an engaging portion of the gusset.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
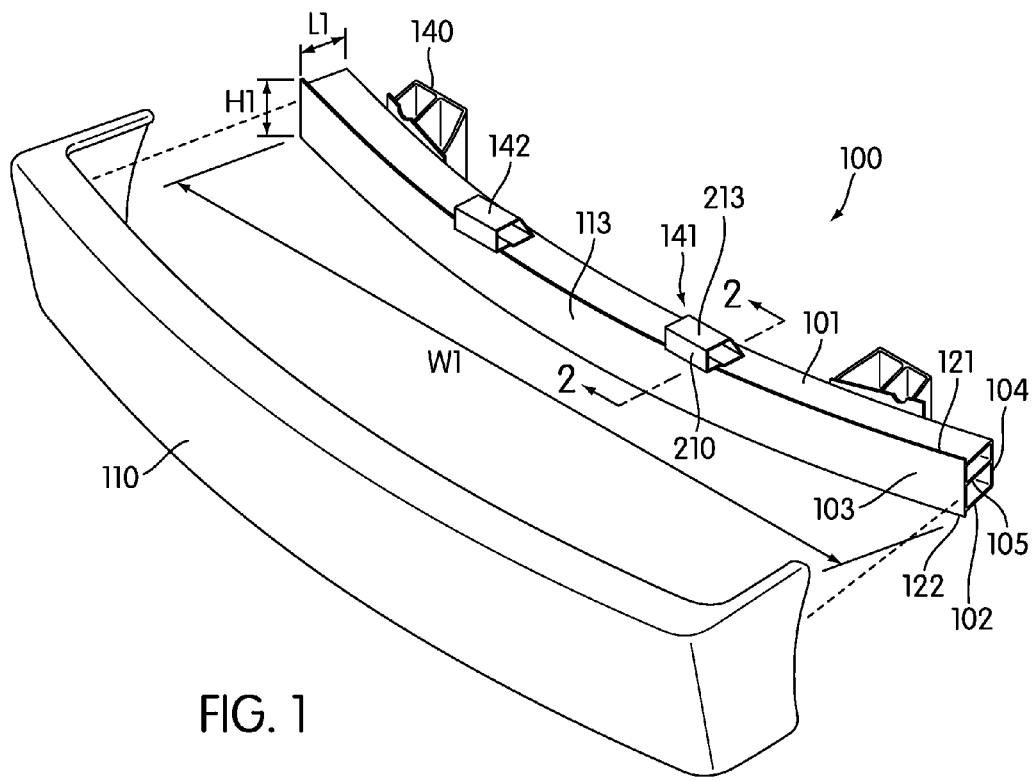
FIG. 1 is an isometric view of a preferred embodiment of a bumper beam with two gussets.

FIG. 1 is an isometric view of a preferred embodiment of a bumper system comprising bumper beam 100. Referring to FIG. 1, bumper beam 100 is preferably associated with a motor vehicle of some kind. Generally, bumper beam 100 may be associated with any type of motor vehicle including, but not limited to cars, trucks, vans, minivans, SUV's, motorcycles, scooters, boats, personal watercraft, and aircraft.

Generally, bumper beam 100 can be installed in any location of a motor vehicle including, but not limited to a front portion or a rear portion of a motor vehicle. In this preferred embodiment, bumper beam 100 can be installed in a rear portion of a motor vehicle, not illustrated in this Figure for purpose of clarity. Furthermore, bumper beam 100 can be installed in a motor vehicle in any manner known in the art. In this preferred embodiment, bumper beam 100 is installed with extension brackets 140 to secure bumper beam 100 to a body or frame of a motor vehicle.

Preferably, bumper beam 100 can be covered by a bumper cover of some kind. In this preferred embodiment, bumper beam cover 110 can be attached to bumper beam 100 and cover bumper beam 100 and any components attached to bumper beam 100. Using this arrangement, bumper beam cover 110 can provide a finished appearance for bumper beam 100. For illustrative purposes, bumper beam cover 110 is removed from bumper beam 100 in this illustration.

Generally, bumper beam 100 can be constructed in any manner to protect a portion of a motor vehicle. In this preferred embodiment, bumper beam 100 includes top surface 101. Similarly, bumper beam 100 includes bottom surface 102, disposed opposite top surface 101. Likewise, bumper beam 100 includes front surface 103 and back surface 104, disposed opposite of front surface 103. Front surface 103 may be disposed to face outward from a motor vehicle to receive an impact during a collision. In a similar manner, back surface 104 may be disposed facing toward the motor vehicle.

In some embodiments, surfaces of bumper beam 100 may be generally flush with each other. In other embodiments, a first surface of bumper beam 100 can extend past a second surface to form a lip structure. In this preferred embodiment, front surface 103 extends past top surface 101 to create upper lip 121. In addition, front surface 103 also extends past bottom surface 102 to create lower lip 122. With this arrangement, upper lip 121 and lower lip 122 increase the surface area of front surface 103.

Preferably, a bumper beam is configured to prevent significant damage to a motor vehicle during a collision. At the same time, style and weight considerations can effect the configuration of the bumper beam. These considerations can be addressed by configuring the bumper beam with various sizes. In particular, a bumper beam may be configured with a size that reduces the weight burden to the motor vehicle.

In this embodiment, bumper beam 100 comprises width W1 in a lateral direction. The term "lateral direction" as used throughout this detailed description and in the claims refers to a direction that runs between two sides of a motor vehicle. Preferably, width W1 covers a substantial portion of a width of rear portion of a motor vehicle. Similarly, bumper beam 100 is configured with length L1 in a longitudinal direction. The term "longitudinal direction" as used throughout this detailed description and in the claims refers to a direction that is perpendicular to the lateral direction. In some cases, the longitudinal direction may run between a front of a motor vehicle and a back of a motor vehicle. Finally, front surface 103 comprises height H1 in a vertical direction. The term "vertical direction" as used throughout this detailed description and in the claims refers to a direction that is perpendicular to the lateral direction and the longitudinal direction. In this preferred embodiment, length L1 and height H1 are substantially smaller than width W1.

In different embodiments, the values of length L1, height H1 and width W1 can vary. In some cases, varying the dimensions of bumper beam 100 can help modify the impact absorbing characteristics of bumper beam 100. Furthermore, by varying the dimensions of bumper beam 100 the weight of bumper beam 100 can also be adjusted.

In different embodiments, the shape of bumper beam 100 may vary. In some embodiments, bumper beam 100 may be relatively straight in a lateral direction. In other embodiments, bumper beam 100 may be curved in a lateral direction. In a preferred embodiment, bumper beam 100 can have a generally convex shape in a lateral direction. In particular, center portion 113 of front surface 103 may protrude outward in a longitudinal direction from a portion of a motor vehicle. Likewise, ends of bumper beam 100 may be disposed inward and closer to a motor vehicle in a longitudinal direction. With this arrangement, center portion 113 of front surface 103 may contact an impacting object first, during a head-on collision.

In some cases, bumper beam 100 can include provisions for increasing strength in a longitudinal direction. In this embodiment, bumper beam 100 is configured with interior wall 105. Interior wall 105 preferably extends between front surface 103 and back surface 104. Preferably, this configuration of interior wall 105 assists bumper beam 100 during a collision.

Figure 2:
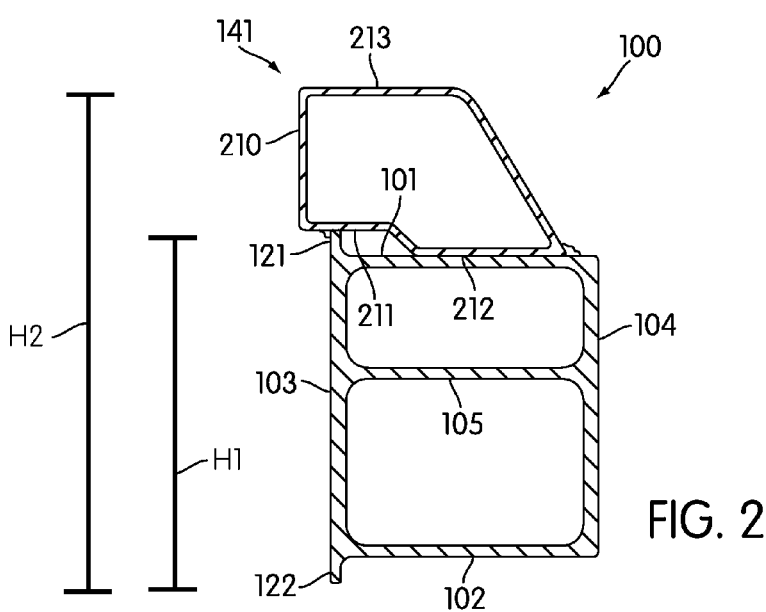
FIG. 2 is a side cross sectional view of a preferred embodiment of a bumper beam and a gusset.

Generally, bumper beam 100 can be configured with any shape in cross section to protect a portion of a motor vehicle. FIG. 2 illustrates a side cross sectional view of a preferred embodiment of bumper beam 100. In this embodiment, bumper beam 100 is configured with a generally rectangular shape. In other embodiments, bumper beam 100 can be configured with other shapes in cross section including, but not limited to squares, trapezoids, triangles, as well as irregular shapes. Preferably, the cross sectional shape of bumper beam 100 provides support to bumper beam 100 during a collision to protect a portion of a motor vehicle.

During a collision with a barrier, a bumper beam is preferably configured to engage the barrier to prevent significant damage to a motor vehicle. The term "barrier" as used throughout this detailed description and in the claims refers to an object that contacts a motor vehicle during a collision. Generally, a barrier may be a motor vehicle or another object that may be stationary or moving. By remaining engaged with the barrier, a bumper beam may crush to absorb the impact of the collision and prevent further damage to the motor vehicle. However, in some cases, a bumper beam may fail to remain engaged with a barrier during a collision and the bumper beam may underride the barrier. The term "underride" as used throughout this detailed description and in the claims refers to a bumper beam slipping underneath a barrier during a collision. If a bumper beam underrides a barrier, the bumper beam can fail to prevent the barrier from impacting a portion of a motor vehicle. This can cause extensive body damage to a motor vehicle even during a low speed impact with a barrier.

Preferably, a bumper beam is configured with provisions to prevent underride during a collision. For example, a bumper beam may be configured with an underride bar that spans the length of the bumper beam and increases the effective height of the bumper beam. In a preferred embodiment, a bumper beam includes gussets configured to increase engagement with a barrier during a collision and prevent underriding of the bumper beam.

Referring to FIG. 1, bumper beam 100 is configured with first gusset 141 and second gusset 142. Generally, first gusset 141 and second gusset 142 have a shape that is configured to increase engagement with a barrier and reduce underride during a collision. In some embodiments, first gusset 141 and second gusset 142 may be configured with different shapes. In a preferred embodiment, first gusset 141 and second gusset 142 may be configured with substantially similar shapes.

In the current embodiment, first gusset 141 is configured with a generally elbow-like shape, as seen in FIG. 2. In particular, first gusset 141 includes first engaging portion 210. In this embodiment, first engaging portion 210 is substantially flat. In other cases, however, first engaging portion 210 could be curved. Furthermore, first engaging portion 210 is oriented in a substantially similar direction as front surface 103 of bumper beam 100. In some cases, first gusset 141 may also include upper portion 213 disposed adjacent to first engaging portion 210. In addition, first gusset 141 is also configured with first attachment portion 211 disposed opposite upper portion 213. Finally, first gusset 141 includes second attachment portion 212. Generally, first engaging portion 210, upper portion 213, first attachment portion 211 and second attachment portion 212 can have any shape. In some embodiments, first engaging portion 210, upper portion 213, first attachment portion 211 and second attachment portion 212 may comprise one or more substantially flat planar surfaces. In other embodiments, first engaging portion 210, upper portion 213, first attachment portion 211 and second attachment portion 212 could be configured with some curvature. With this preferred configuration, first gusset 141 is configured to increase engagement with a barrier during a collision and reduce the occurrence of underride of bumper beam 100. Although only first gusset 141 is illustrated in FIG. 2, it should be assumed that second gusset 142 is configured in a substantially similar manner.

Generally, gussets may comprise any material known in the art including, but not limited to steel, stamped steel, aluminum, and extruded aluminum. In a preferred embodiment, gussets can be made of extruded aluminum.

Preferably, first gusset 141 and second gusset 142 are secured to bumper beam 100 in a manner that prevents first gusset 141 and second gusset 142 from bending and rotating when impacted by a barrier during a collision. Generally, first gusset 141 and second gusset 142 may be secured to bumper beam 100 with any manner known in the art including, but not limited to welding, soldering or adhesives. In this preferred embodiment, first gusset 141 and second gusset 142 are secured to bumper beam 100 through metal inert gas (MIG) welding. In particular, first attached portion 211 of first gusset 141 is secured with a T-weld to upper lip 121 of front surface 103, as illustrated in FIG. 2. Furthermore, second attached portion 212 of first gusset 141 is welded to top surface 101 of bumper beam 100. Preferably, second gusset 142 is secured to bumper beam 100 in a substantially similar manner. By securing first gusset 141 and second gusset 142 to both top surface 101 and front surface 103 of bumper beam, first gusset 141 and second gusset 142 may be prevented from bending and rotating during an impact with a barrier.

In some embodiments, using one or more gussets may help increase the effective height of a bumper beam without a substantial increase in weight. Referring to FIG. 2, bumper beam 100 has a height H1, as previously discussed. Preferably, the effective height of bumper beam 100 is increased to height H2 by the presence of second gusset 142. Likewise, the effective height of bumper beam 100 may be increased to a similar height by the presence of first gusset 141. With this arrangement, the effective height of bumper beam 100 is increased at various locations along bumper beam 100 without a substantial increase in the overall weight of bumper beam 100.

Generally, gussets may be disposed on a bumper beam in any location to increase engagement with a barrier during a collision and prevent underriding of the bumper beam. In some embodiments, gussets can be disposed lengthwise on a bumper beam. In some cases, gussets can be recessed from a front surface of the bumper beam in a longitudinal direction. In a preferred embodiment, gussets can disposed lengthwise on a bumper beam and overhang a front surface of a bumper beam. In particular, gussets may be configured to overhang a front surface of a convex shaped bumper beam so that the gussets and a center portion of the front surface of the bumper beam are coincident with a plane oriented in a generally vertical direction. This configuration ensures that a barrier striking a bumper beam may substantially simultaneously contact the center portion and gussets.

Figure 3:
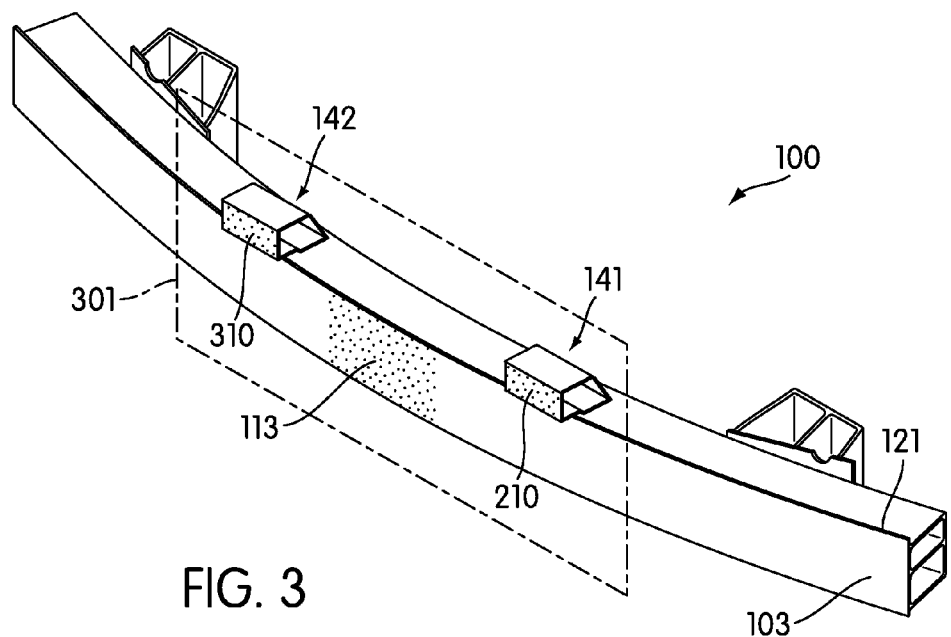
FIG. 3 is an isometric view of a preferred embodiment of a bumper beam with two gussets and a vertical plane.

FIG. 3 is an isometric view of a preferred embodiment of bumper beam 100 with generally vertical plane 301. In this preferred embodiment, first gusset 141 and second gusset 142 are disposed lengthwise on bumper beam 100. In particular, first gusset 141 and second gusset 142 overhang upper lip 121 and front surface 103 in a generally longitudinal direction. Furthermore, first gusset 141 and second gusset 142 are offset from center portion 113. With this configuration, generally vertical plane 301 is coincident with first engaging portion 210 of first gusset 141 and second engaging portion 310 of second gusset 142 as well as center portion 113. With this arrangement, a barrier colliding with bumper beam 100 can impact center portion 113, first gusset 141 and second gusset 142 substantially simultaneously. This configuration preferably assists in the engagement of a barrier. In particular, first gusset 141 and second gusset 142 may cooperate with center portion 113 during a collision to increase the efficiency of impact absorption of bumper beam 100. Furthermore, this arrangement helps to prevent bumper beam 100 from underriding the barrier.

Generally, a bumper beam can include any number of gussets to increase engagement with a barrier and prevent underriding. In some embodiments, a bumper beam may include one gusset. In another embodiment, a bumper beam may include two gussets, as previously discussed. In still another other embodiments, a bumper beam may include three or more gussets. In another preferred embodiment, a bumper beam may include four gussets.

Figure 4:
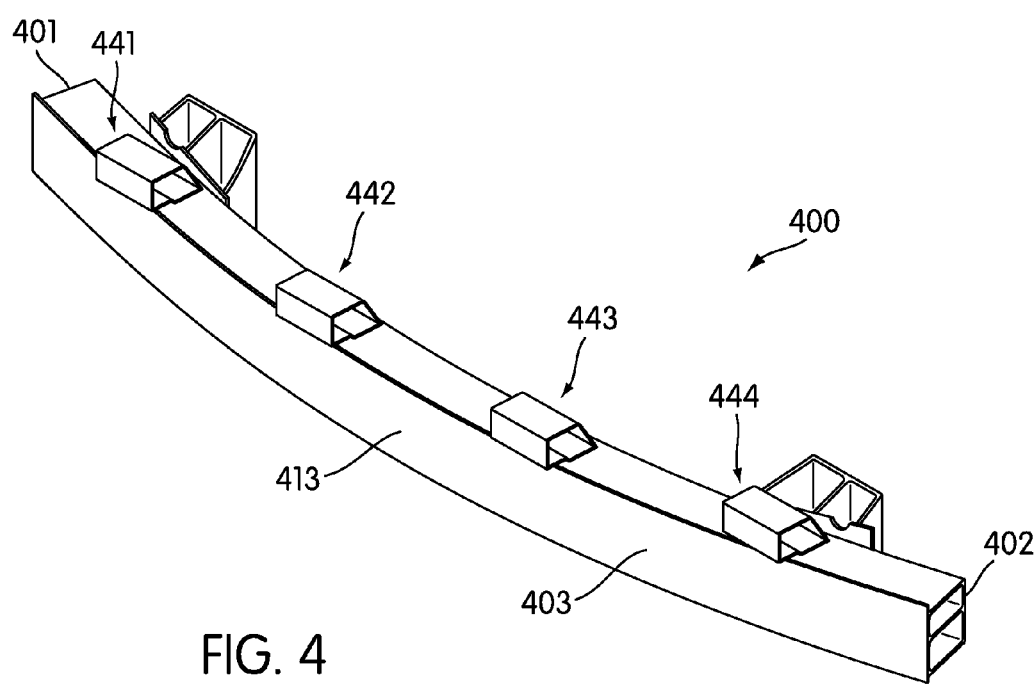
FIG. 4 is an isometric view of an alternative embodiment of a bumper beam with four gussets.

FIG. 4 is an isometric view of an alternative embodiment of bumper beam 400. In this embodiment, bumper beam 400 includes four gussets. In particular, bumper beam 400 includes first gusset 441, second gusset 442, third gusset 443 and fourth gusset 444.

As previously mentioned, gussets on a bumper beam can be disposed in any location. In this embodiment, second gusset 442 and third gusset 443 may be disposed in a manner substantially similar to first gusset 141 and second gusset 142 of the previous embodiment. In particular, second gusset 442 and third gusset 443 can overhang front surface 403 of bumper beam 400. In addition, second gusset 442 and third gusset 443 are offset from center portion 413 of front surface 403. With this arrangement, second gusset 442 and third gusset 443 are disposed in a manner so that a barrier striking bumper beam 400 will contact center portion 413 as well as second gusset 442 and third gusset 443 substantially simultaneously.

Preferably, first gusset 441 and fourth gusset 444 are disposed to increase engagement with a barrier and prevent the underriding of bumper beam 400 during a collision. In this embodiment, first gusset 441 is disposed between first end 401 of bumper beam 400 and second gusset 442. In particular, first gusset 441 may be disposed approximately equally distant from first end 401 and second gusset 442. Similarly, fourth gusset 444 is disposed between second end 402 of bumper beam 400 and third gusset 443. Likewise, fourth gusset 444 is also disposed approximately equally distant from second end 402 and third gusset 443. With this arrangement, first gusset 441 and fourth gusset 444 can provide additional support in engaging a barrier during a collision and preventing the underriding of bumper beam 400.

FIGS. 5-13 are side views of illustrative and exemplary embodiments of barrier 530 colliding with a rear portion of a motor vehicle configured with a bumper beam. Although collisions with rear portions of motor vehicles are described in these Figures, in other cases, these collisions could occur with generally similar results with another portion of a motor vehicle configured with a bumper beam, such as a front portion.

In these embodiments, barrier 530 collides with motor vehicles while moving at approximately 10 kilometers per hour to simulate low speed impacts with the motor vehicles. Furthermore, barrier 530 is simulating a head-on or direct collision in these embodiments. In addition, barrier 530 is disposed at a greater height than the bumper beams described in these embodiments. This greater height is intended to simulate a collision with a taller motor vehicle bumper system, such as truck or sports utility vehicle, for example. It should be understood that the collisions with barrier 530 illustrated in these Figures are intended to be illustrative or exemplary. In other embodiments, these collisions with barrier 530 may proceed in another manner.

Figure 5:
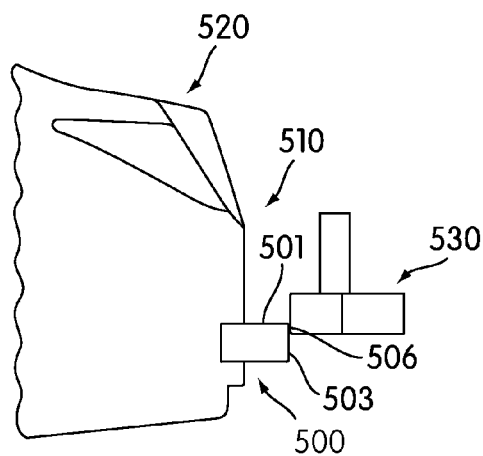
FIG. 5 is a side view of an illustrative embodiment of a barrier colliding with a bumper beam disposed on a rear portion of a motor vehicle.
Figure 6:
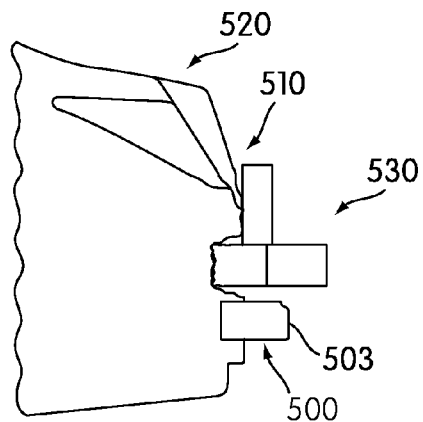
FIG. 6 is a side view of an illustrative embodiment of a barrier colliding with a bumper beam disposed on a rear portion of a motor vehicle.

FIGS. 5 and 6 are side views of an illustrative embodiment of rear portion 510 of motor vehicle 520 colliding with barrier 530. In this embodiment, rear portion 510 of motor vehicle 520 includes bumper beam 500. Bumper beam 500 is configured in a substantially similar manner as bumper beam 100 of a previous embodiment. However, in this embodiment, bumper beam 500 is configured without gussets to assist in the engagement of barrier 530 during the collision.

When the collision between rear portion 510 and barrier 530 occurs, barrier 530 first contacts bumper beam 500, as illustrated in FIG. 5. In particular, in this embodiment, barrier 530 contacts front surface 503 of bumper beam 500. Due to the difference in height between barrier 530 and bumper beam 500, barrier 530 contacts upper portion 506 of front surface 503.

As the collision continues, bumper beam 500 fails to engage barrier 530. Referring to FIG. 6, barrier 530 slides off front surface 503 of bumper beam 500 causing bumper beam 500 to underride barrier 530. In some cases, this may occur because of the difference in heights of barrier 530 and bumper beam 500. As bumper beam 500 underrides barrier 530, barrier 530 drives over bumper beam 500 and collides with rear portion 510 of motor vehicle 520. This collision with rear portion 510 can cause extensive body damage to components of rear portion 510 including, but not limited to a trunk, a rear panel, and tail lights. By failing to engage barrier 530, bumper beam 500 underrides barrier 530 and fails to prevent damage to rear portion 510 of motor vehicle 530.

Figure 7:
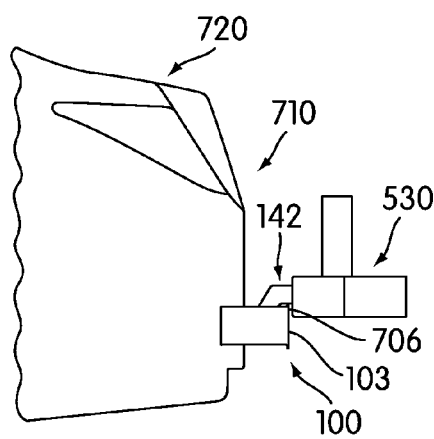
FIG. 7 is a side view of a preferred embodiment of a barrier colliding with a bumper beam disposed on a rear portion of a motor vehicle.
Figure 8:
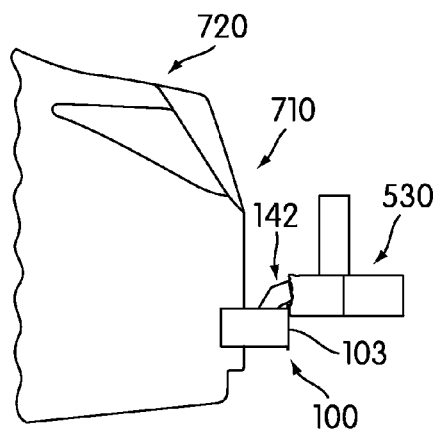
FIG. 8 is a side view of a preferred embodiment of a barrier colliding with a bumper beam disposed on a rear portion of a motor vehicle.

In contrast, a bumper beam with gussets configured to increase engagement with a barrier may prevent underriding of the bumper beam during a collision. FIGS. 7 and 8 illustrate an exemplary embodiment of rear portion 710 of motor vehicle 720 colliding with barrier 530. In this embodiment, rear portion 710 of motor vehicle 720 is configured with bumper beam 100. As previously discussed and illustrated in FIGS. 1-3, bumper beam 100 includes first gusset 141, not visible in these Figures, and second gusset 142 configured to increase engagement with a barrier during a collision.

Referring to FIG. 7, barrier 530 contacts bumper beam 100 as the collision begins. In particular, barrier 530 contacts upper portion 706 of front surface 103 as well as first gusset 141, not visible in this Figure, and second gusset 142 substantially simultaneously. Preferably, this configuration allows front surface 103, first gusset 141 and second gusset 242 to cooperate and maintain engagement with barrier 530 during the entire collision. With this engagement, bumper beam 100 can be prevented from underriding barrier 530.

In some cases, barrier 530 can slide off front surface 103 as the collision progresses, as illustrated in FIG. 8. This may occur due to the height difference between barrier 530 and bumper beam 100, for example. In this embodiment, however, first gusset 141, not visible in this Figure, and second gusset 142 remain engaged with barrier 530 for the duration of the collision. By remaining engaged with barrier 530, first gusset 141 and second gusset 142 prevent bumper beam 100 from underriding. With this configuration, bumper beam 100 avoids an underride situation and prevents barrier 530 from contacting rear portion 710 of motor vehicle 720. Using this arrangement of first gusset 141 and second gusset 142, bumper beam 100 remains engaged with barrier 530 for the duration of the collision and prevents potentially extensive damage to rear portion 710. Instead, this preferred configuration promotes beam crush so that bumper beam 500 receives the impact of the collision with barrier 500 and protects rear portion 710.

Figure 9:
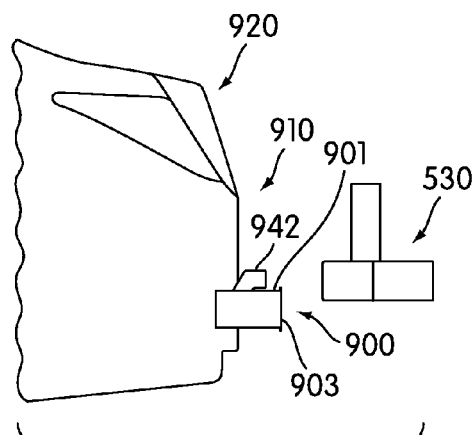
FIG. 9 is a side view of an alternative embodiment of a bumper beam with gussets.

In some embodiments, gussets configured to increase engagement and prevent a bumper beam from underriding during a collision can be recessed with respect to a front surface of the bumper beam. FIG. 9 is a side view of an exemplary embodiment of rear portion 910 of motor vehicle 920 prior to a collision with barrier 530. In this alternative embodiment, rear portion 910 includes bumper beam 900. Preferably, bumper beam 900 is configured in a substantially similar manner as bumper beam 100 of the previous embodiment. However, in this embodiment, bumper beam 900 includes two gussets recessed with respect to front surface 903 of bumper beam 900.

In this alternative embodiment, bumper beam 900 includes gussets 942. Gussets 942 preferably include two gussets, although only one gusset is visible in this side view. In this alternative embodiment, gussets 942 may comprise substantially similar shapes as the gussets discussed in previous embodiments. Furthermore, gussets 942 are disposed on top surface 901 of bumper beam 900 lengthwise in a similar manner as the preferred embodiment illustrated in FIG. 1. Likewise, gussets 942 are offset from a center portion of bumper beam 900. In this alternative embodiment, however, gussets 942 are recessed in a longitudinal direction with respect to front surface 903. With this arrangement, a barrier colliding with bumper beam 900 will not contact gussets 942 and barrier 900 substantially simultaneously.

Figure 10:
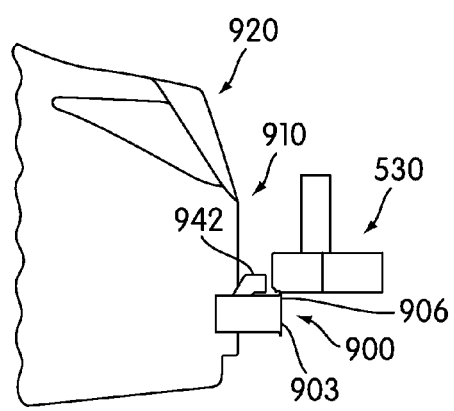
FIG. 10 is a side view of an alternative embodiment of a barrier colliding with a bumper beam disposed on a rear portion of a motor vehicle.
Figure 11:
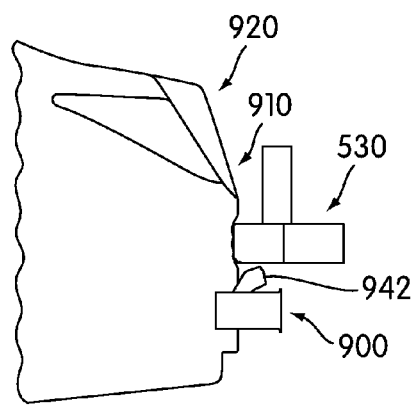
FIG. 11 is a side view of an alternative embodiment of a barrier colliding with a bumper beam disposed on a rear portion of a motor vehicle.

FIGS. 10 and 11 illustrate an exemplary embodiment of rear portion 910 of motor vehicle 920 colliding with barrier 530. Referring to FIG. 10, the collision begins with barrier 530 contacting front surface 903 of bumper beam 900. In particular, barrier 530 contacts upper portion 906 of front surface 903 due to the difference in heights between barrier 530 and bumper beam 900. Furthermore, barrier 530 does not contact gussets 942 at this point since gusset 942 are recessed with respect to front surface 903. In this embodiment, front surface 903 fails to substantially engage barrier 530 and barrier 530 slides over front surface 903.

Referring to FIG. 11, as barrier 530 slides over front surface 903, barrier 530 contacts recessed gussets 942. Preferably, gussets 942 absorb some of the impact of the collision with barrier 930. However, gussets 942 fail to fully engage barrier 530. Instead, due to the recessed configuration of gussets 942, barrier 530 slides over gussets 942. This causes an underride situation as barrier 530 rides over bumper beam 900. With this configuration, barrier 530 impacts rear portion 910 of motor vehicle 900.

Preferably, the contact between barrier 530 and gussets 942 reduces some of the force of the impact of barrier 530 with rear portion 910. With this arrangement, rear portion 910 can sustain less damage than would occur using an arrangement with no gussets. Referring back to FIGS. 5 and 6, barrier 530 rides over front surface 503 to impact rear portion 510. In this embodiment, bumper beam 500 is not configured with gussets. Therefore, barrier 530 collides with rear portion 510 without a further reduction in the force of the impact. This results in more extensive damage to rear portion 510 than the less extensive damage sustained by rear portion 910 due to the presence of gussets 942.

Figure 12:
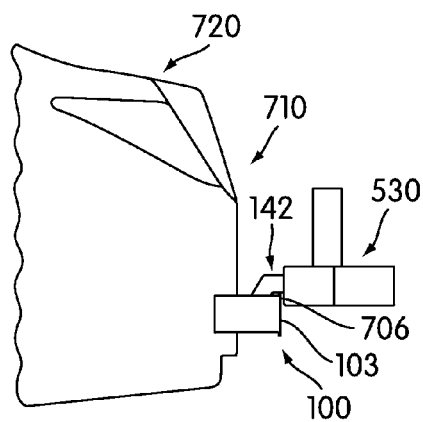
FIG. 12 is a side view of a preferred embodiment of a barrier colliding with a bumper beam disposed on a rear portion of a motor vehicle.
Figure 13:
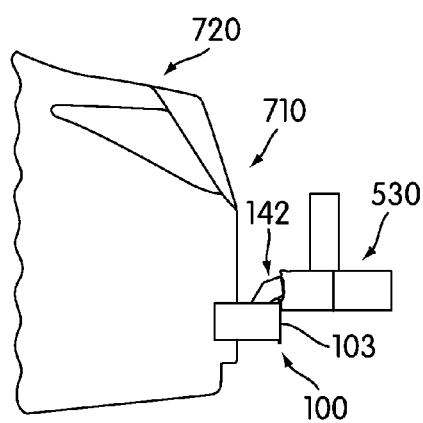
FIG. 13 is a side view of a preferred embodiment of a barrier colliding with a bumper beam disposed on a rear portion of a motor vehicle.

However, due to the configuration of gussets 942 in the embodiment illustrated in FIGS. 9-11, bumper beam 900 fails to fully engage barrier 530 and underrides barrier 530. This causes some damage to rear portion 910 as bumper beam 900 underrides barrier 530 and allows barrier 530 to contact rear portion 910. In contrast, gussets configured to engage a barrier substantially simultaneously with a central portion of a front surface of a bumper beam can more effectively prevent a bumper beam from underriding a barrier. FIGS. 12 and 13 are identical to FIGS. 7 and 8, respectively, and illustrate an exemplary embodiment of bumper beam 100 with first gusset 141, not visible in this Figure, and second gusset 142 configured to contact barrier 530 with front surface 103 substantially simultaneously. This preferred arrangement allows bumper beam 100 to remain engaged with barrier 530 for the duration of the collision. With this engagement, bumper beam 100 is prevented from underriding barrier 530. This allows bumper beam 100 to stop barrier 530 from contacting rear portion 710 of motor vehicle 720 and causing potential damage.

This preferred configuration of gussets disposed on a bumper beam allows the bumper beam to provide substantially similar benefits of a taller bumper beam to a portion of a motor vehicle. In particular, a bumper beam with a preferred configuration of gussets can greatly increase bumper beam engagement during an impact with a barrier and prevent the bumper beam from underriding the barrier. However, the cost and weight of a bumper beam configured with gussets can be much less than the cost and weight of a taller bumper beam.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A motor vehicle, comprising:
a bumper beam having a generally convex shape;
the bumper beam including a front surface including a center portion;
a gusset comprising a first portion disposed on a top surface of the bumper beam and a second portion overhanging a front edge of the bumper, the two portions forming the shape of a bent elbow;
the gusset including an engaging portion; and
wherein the engaging portion and the center portion are generally co-planar.

2. The motor vehicle according to claim 1, wherein the gusset first portion and the gusset second portion are joined generally at an obtuse angle.

3. The motor vehicle according to claim 1, wherein the engaging portion and the center portion are configured to contact a barrier during a collision substantially simultaneously.

4. The motor vehicle according to claim 1, wherein the bumper beam includes two gussets.

5. The motor vehicle according to claim 4, wherein the two gussets are spaced apart along the bumper beam in a lateral direction.

6. The motor vehicle according to claim 1, wherein the bumper beam includes three or more gussets.

7. The motor vehicle according to claim 1, wherein the bumper beam includes four gussets.

8. The motor vehicle according to claim 7, wherein the four gussets are spaced apart along the bumper beam in the lateral direction.

9. A motor vehicle, comprising:
a bumper beam having a generally convex shape;
the bumper beam including a front surface and a top surface that is disposed in a generally perpendicular manner to the front surface;
a gusset disposed on a portion of the bumper beam;
the gusset including a first attached portion and a second attached portion; and;

wherein the first attached portion is attached to an upper lip of the front surface and wherein the second attached portion is attached to the top surface.

10. The motor vehicle according to claim 9, further comprising a second gusset disposed on a second portion of the bumper beam.

11. The motor vehicle according to claim 9, wherein the first attached portion and the second attached portion are attached to the bumper beam using a MIG weld.

12. The motor vehicle according to claim 10, wherein the first attached portion is attached to the upper lip using a T-weld.

13. The motor vehicle according to claim 9, wherein the gusset includes an engaging portion.

14. The motor vehicle according to claim 13, wherein the engaging portion extends over a portion of the front surface.

15. A motor vehicle, comprising:
- a bumper beam having a generally convex shape;
- a gusset attached to a portion of the bumper beam, the gusset comprising a first portion and a second portion, the two portions forming the shape of a bent elbow;
- wherein the gusset first portion and the gusset second portion are joined generally at an obtuse angle; and
- wherein the gusset is configured to contact a barrier in a collision substantially simultaneously with a portion of the bumper beam.

16. The motor vehicle according to claim 15, wherein the portion of the bumper beam is a center portion.

17. The motor vehicle according to claim 15, wherein two gussets are configured to contact the barrier substantially simultaneously with the portion of the bumper beam.

18. The motor vehicle according to claim 17, wherein three or more gussets are configured to contact the barrier substantially simultaneously with the portion of the bumper beam.

19. The motor vehicle according to claim 15, wherein the bumper beam is associated with a rear portion of the motor vehicle.

20. The motor vehicle according to claim 15, wherein the bumper beam is associated with a front portion of the motor vehicle.

21. The motor vehicle according to claim 16, wherein the center portion is substantially co-planar with an engaging portion of the gusset.

22. A bumper system for a motor vehicle, comprising:
- a bumper beam including a front surface and a top surface;
- a gusset disposed on the bumper beam; the gusset including a first attachment portion and a second attachment portion;
- wherein the first attachment portion is attached to the front surface and wherein the second attached portion is attached to the top surface; and
- wherein the gusset overhangs the front surface without covering the front surface.

23. The bumper system according to claim 22, wherein the gusset is configured to contact a barrier substantially simultaneously with a portion of the front surface.

24. The bumper system according to claim 22, wherein the front surface includes center portion and wherein the center portion is substantially co-planar with an engaging portion of the gusset.

* * * * *